(12) United States Patent
Maier

(10) Patent No.: US 9,987,948 B2
(45) Date of Patent: Jun. 5, 2018

(54) CONDUCTOR LINE, CURRENT COLLECTOR, AND CONDUCTOR LINE SYSTEM

(71) Applicant: CONDUCTIX-WAMPLER GMBH, Weil am Rhein (DE)

(72) Inventor: Bernd Maier, Schlingen (DE)

(73) Assignee: CONDUCTIX-WAMPFLER GMBH, Weil am Rhein (DE)

( * ) Notice: Subject to any disclaimer, the term of this patent is extended or adjusted under 35 U.S.C. 154(b) by 109 days.

(21) Appl. No.: 14/898,653

(22) PCT Filed: Mar. 23, 2015

(86) PCT No.: PCT/EP2015/056124
§ 371 (c)(1),
(2) Date: Dec. 15, 2015

(87) PCT Pub. No.: WO2015/180856
PCT Pub. Date: Dec. 3, 2015

(65) Prior Publication Data
US 2017/0217333 A1 Aug. 3, 2017

(30) Foreign Application Priority Data

May 27, 2014 (DE) .................. 10 2014 107 468

(51) Int. Cl.
*B60M 1/00* (2006.01)
*B60M 1/06* (2006.01)
(Continued)

(52) U.S. Cl.
CPC ............... *B60M 1/06* (2013.01); *B60L 5/40* (2013.01); *B60M 1/34* (2013.01); *B60M 5/02* (2013.01); *B66C 13/12* (2013.01)

(58) Field of Classification Search
CPC .. B60M 1/06; B60M 1/34; B60M 5/02; B60L 5/40; B60L 5/42; B66C 13/12
See application file for complete search history.

(56) References Cited

U.S. PATENT DOCUMENTS 4,331,959 A * 5/1982 Brauer .................... B61L 3/227
191/10
5,018,009 A 5/1991 Koerv
(Continued)

FOREIGN PATENT DOCUMENTS

DE 2555909 6/1978
DE 2918178 11/1980
(Continued)

OTHER PUBLICATIONS

Chinese First Examiner Report for Application No. 201580000962. X, dated Sep. 20, 2016, 5 pages.
(Continued)

*Primary Examiner* — Jason C Smith
(74) *Attorney, Agent, or Firm* — Paul D. Bianco; Gary S. Winer; Fleit Gibbons Gutman Bongini & Bianco PL

(57) ABSTRACT

A conductor line for supplying an electric load movable on the conductor line in the longitudinal direction of the conductor line, includes at least one conductor strand which runs in the longitudinal direction and has an electrically conductive profiled conductor section for contacting a sliding contact of a current collector of the load and at least one elongated slotted waveguide, which runs in the longitudinal direction, with a longitudinal slot for receiving an antenna which can be moved together with the load. A related current collector and a conductor line system are also provided. The aim is to allow a compact and material-saving design with good fault-tolerant transmission. This is achieved by a conductor line in which the longitudinal slot is tilted by an angle which does not equal 90° about the longitudinal (Continued)

direction with respect to a movement plane on which the current collector can be moved, by a current collector in which the antenna or a part thereof is completely or partly tilted by an angle which also does not equal 90° about the longitudinal direction with respect to the movement plane, and by a conductor line system including such a conductor line and current collector.

17 Claims, 2 Drawing Sheets

(51) Int. Cl.
    *B60M 1/34*         (2006.01)
    *B60L 5/40*          (2006.01)
    *B60M 5/02*         (2006.01)
    *B66C 13/12*        (2006.01)

(56) References Cited

U.S. PATENT DOCUMENTS

| | | | | |
|---|---|---|---|---|
| 5,521,487 | A * | 5/1996 | Liu | B60L 9/005 |
| | | | | 323/207 |
| 6,492,746 | B1 * | 12/2002 | Hernando Grande | B60M 1/06 |
| | | | | 174/32 |
| 2010/0181098 | A1 * | 7/2010 | Schmiedle | B60M 1/34 |
| | | | | 174/175 |
| 2010/0252297 | A1 * | 10/2010 | Schmiedle | B60M 1/346 |
| | | | | 174/68.2 |
| 2014/0159968 | A1 * | 6/2014 | Maier | B60L 5/40 |
| | | | | 343/711 |
| 2016/0129812 | A1 * | 5/2016 | Seidel | B60M 1/34 |
| | | | | 191/23 R |
| 2016/0130851 | A1 * | 5/2016 | Storm | B60L 11/1818 |
| | | | | 49/31 |
| 2016/0137101 | A1 * | 5/2016 | Eckle | H01B 5/08 |
| | | | | 191/23 R |
| 2017/0057359 | A1 * | 3/2017 | Lang | B60L 5/08 |
| 2017/0217333 | A1 * | 8/2017 | Maier | B60M 1/06 |

FOREIGN PATENT DOCUMENTS

| | | |
|---|---|---|
| DE | 3012790 | 10/1981 |
| DE | 3323984 | 1/1985 |
| DE | 3505469 | 8/1986 |
| DE | 3902076 | 8/1990 |
| DE | 102004008571 | 10/2005 |
| DE | 10 2004 049 982 A1 | 3/2006 |
| DE | 102009024518 | 2/2010 |
| DE | 102009052871 | 3/2011 |
| DE | 102010048586 | 7/2011 |
| DE | 102009061067 A1 | 3/2012 |
| DE | 102011119351 | 10/2012 |
| DE | 102011108584 | 1/2013 |
| DE | 102012002085 | 8/2013 |
| WO | 2011/047777 A2 | 4/2011 |

OTHER PUBLICATIONS

English translation of International Preliminary Report on Patentability dated Nov. 29, 2016 for PCT/EP2015/056124.
International Preliminary Report on Patentability dated Nov. 29, 2016 for PCT/EP2015/056124.
English translation of Written Opinion for PCT/EP2015/056124 filed Mar. 23, 2015.
International Search Report dated Jun. 29, 2015 for PCT/EP2015/056124, filed Mar. 23, 2015.
Result of examination report for German Application No. 10 2014 107 468.8, filed May 27, 2014.
Written Opinion for PCT/EP2015/056124, filed Mar. 23, 2015.

* cited by examiner

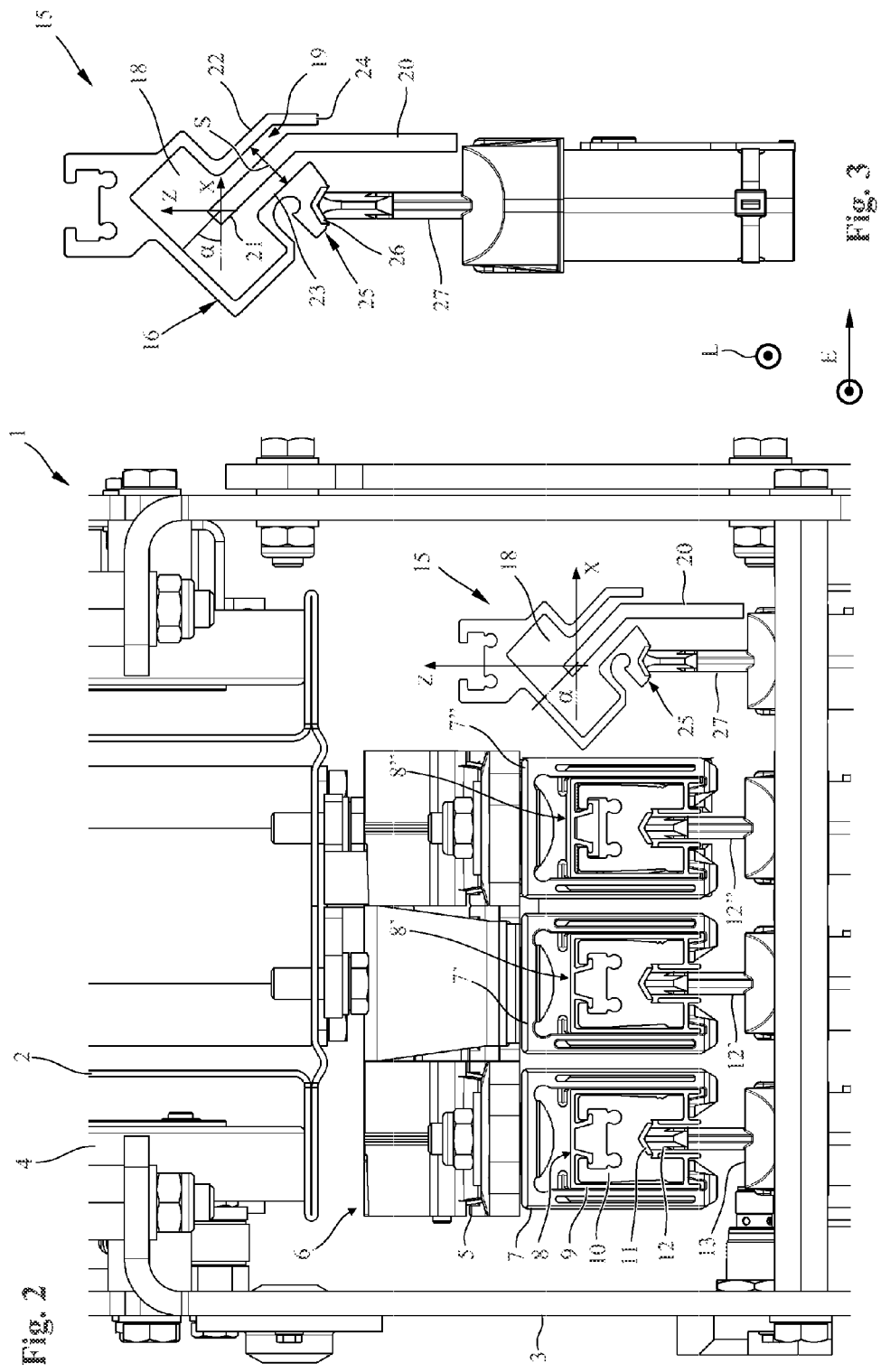

CONDUCTOR LINE, CURRENT COLLECTOR, AND CONDUCTOR LINE SYSTEM

FIELD OF THE INVENTION

The invention concerns a conductor line, a current collector, and a conductor line system.

BACKGROUND OF THE INVENTION

In known conductor line systems, a traveling electrical load travels along a conductor line. To supply the load with electrical power, same is equipped with a current collector whose sliding contacts engage in conductor strands guided along the conductor line. The load can be, for example, a transport gear of a suspended railway, a cable trolley movable on rails, or so-called E-RTG container cranes, which are equipped with electric traction supplied with electrical power from the conductor line.

In order to be able to transmit data to the load, for example, control data, so-called slotted waveguides or leaky waveguides, are guided in known conductor line systems parallel to the conductor strands into which antennas arranged on the load engage.

Thus, DE 10 2004 008 571 B4 discloses a support rail profile of a support rail designed as a double-T support with integrated slotted waveguides for data transmission in a conductor rail arrangement. The slotted waveguide is provided in the lower foot part of the support rail with a longitudinal slit pointing downward, into which an antenna of the vehicle traveling along the support rail extends. Power rail holders with power rails mounted therein are arranged laterally on the support rails, i.e., rotated by 90° relative to the longitudinal slot.

DE 10 2011 119 351 A1 discloses a transport system with a rail-borne vehicle and rail profile parts of a rail system in which a slotted waveguide is arranged on a rail profile part and two antennas on the vehicle, which are spaced away from each other in the rail direction and extend into the slotted waveguides, the rail profile part being designed straight. The slotted waveguide is also arranged on a double-T support at a spacing relative to the current-conducting conductor strands.

DE 10 2011 108 584 B1 discloses a data transmission arrangement with a slotted waveguide, which is mounted fixed on a stationary installation part in the longitudinal direction. An antenna of a traveling mobile part extends into the longitudinal slot of the slotted waveguide, which can be moved with it lengthwise in the slotted waveguide.

DE 10 2012 002 085 A1 discloses a slotted waveguide for a rail vehicle movable along a rail with a longitudinal slot running laterally. In order to avoid penetration of dust and water into the longitudinal slot of the slotted waveguide, an offset deflection part is arranged on the otherwise 90° tilted T-shaped cavity so that the longitudinal slot is directed downward vertically after the deflection part. The antenna of the rail vehicle then engages the longitudinal slot vertically from below. The electromagnetic waves are therefore deflected downward by the deflection part from the T-shaped cavity profile to the longitudinal slot.

The technique of slotted waveguides for data transmission on rail-borne vehicles has long been known and follows, for example, from DE 25 55 909 C3, DE 29 18 178 A1, DE 33 23 984 A1, DE 30 12 790 C1, and DE 35 05 469 C2 of Messerschmitt-Bölkow-Blohm GmbH, and therefore need not be explained in detail.

A problem in slotted waveguides guided parallel to current-transmitting conductor lines is the disturbance in data transmission in the slotted waveguide by power transmission to the current-conducting conductor line contacts. Because the conductor line contacts cannot always be guided precisely into the current-conducting conductor strands, short contact losses sometimes occur between the conductor line contacts and the conductor strands such that electrical current flow is not interrupted because of the small distances between the current conductor contacts and the conductor strands but is continued through the air. This can lead to disturbances in data transmission. The slotted waveguides are therefore generally guided at a spacing relative to the current- and voltage-carrying conductor strands and sliding contacts.

However, this requires more space for mounting of the slotted waveguides, as follows, among other things, from DE 10 2004 008 571 B4 and DE 10 2011 119 351 A1.

There is the additional drawback that, especially in conductor lines with conductor strands directed vertically downward and therefore conductor line contacts to be introduced from the bottom up, the movable antenna of the slotted waveguide also engages the usually downward-opened T-shaped slotted waveguide from below. In order to obtain good data transmission, the slot-like opening of the slotted waveguide must then be as narrow as possible. However, this means that only relatively limited deviation of the antenna from the desired average path is permitted in the lateral direction across the travel direction, since otherwise the antenna touches the slotted waveguide, which must be avoided in each case. To avoid this, in many applications the T-shaped slotted waveguide is tilted by 90° and therefore arranged so as to have a horizontal opening slot, as shown in DE 10 2004 008 571 B4 and DE 10 2011 119 351 A1. However, this means that moisture and dirt can collect more readily on the lower opening slot of the slotted waveguide. In many arrangements it is also not possible for design reasons to make the slotted waveguide accessible from the side.

DE 10 2009 052 871 A1 discloses a device for contactless power and/or data transmission, in which a vehicle is movable on a rail system that is made from rail profile parts consisting of continuously cast parts. A waveguide is positioned along the rail profile parts in the rail direction, which has a slot running in the rail direction and is assembled from slotted waveguide profile parts. The adjacent slotted waveguide profile parts are joined by means of a profile connector part, each of which is partially inserted into each of the two adjacent slotted waveguide profile parts. The profile connector part then lies against the inside wall of the slotted waveguide profile parts and is designed thin-walled so that the cavity surrounded by the slotted waveguide profile parts is only slightly reduced for passage of electromagnetic waves in the rail direction.

DE 10 2010 048 586 A1 discloses a system with a rail-borne vehicle in which at least one waveguide is formed in one piece on the rail part for data transmission by excitation of at least one mode of the waveguide range.

DE 39 02 076 C1 discloses an arrangement for remote-controlled, track-guided image transmission with a video camera, which is fastened to a movable cart, which has at least one support wheel supported on a support rail. The cart is provided with a drive for the support wheel, a control device for the drive, a manipulator for the video camera, a transmitter and receiver for the remote-controlled signals, an antenna, and at least one guide roller. The stationary support structure has at least one guide rail, on which the guide rollers are supported, as well as a slotted waveguide into which the antenna of the cart engages.

SUMMARY OF THE INVENTION

Some embodiments of the invention disclosed provide a conductor line, a current collector, and a conductor line system that overcome the aforementioned drawbacks and permit compact and material-saving design as well as good, error-tolerant transmission.

Advantageous modifications of the embodiments of the invention are also disclosed.

The conductor line mentioned in the introduction is characterized according to the invention in that the longitudinal slot is tilted around the longitudinal direction by an angle not equal to 90° relative to a travel plane in which the current collector can be moved in the longitudinal direction. The same applies for the current collector mentioned in the introduction, which is characterized according to the invention in that the antenna is tilted around the longitudinal direction by an angle not equal to 90° fully or partially relative to a travel plane in which the current collector can be moved in a longitudinal direction. Because of this, during travel of the antenna in the longitudinal slot of the slotted waveguide, the travel deviations permitted by the limited width of the longitudinal slot across the longitudinal direction and in the travel plane can be increased. These advantages can be utilized well by a conductor line system equipped with such a conductor line and such a current collector.

In an advantageous embodiment, the angle between the longitudinal slot and the travel plane and between the antenna and the travel plane can be greater than or equal to 0°, preferably greater than 0° and less than 90°. The slotted waveguide can also preferably be tilted relative to the travel plane around a further angle not equal to 90° around the longitudinal direction, which is greater than or equal to 0°, preferably greater than 0° and less than 90°. The angle and the additional angle can then advantageously be equally large in order to ensure good data transmission.

In an advantageous embodiment, the longitudinal slot and the contact opening of the conductor strand can be tilted around the angle relative to each other to accommodate the sliding contact.

In an advantageous modification, an end of the antenna extending into the longitudinal slot of the slotted waveguide can also be offset by the angle α. The longitudinal slot and a contact opening of the conductor strand can also be tilted relative to each other by angle α to accommodate the sliding contact. The conductor line can be made more compact and travel deviations occurring in the travel plane across the longitudinal direction can also be better compensated on this account.

In another favorable embodiment, the conductor profile can have at least one sliding surface for a correspondingly shaped and aligned sliding contact surface of the sliding contact across the longitudinal direction next to and/or beneath the longitudinal slot.

The slotted waveguide and the conductor profile can preferably be designed as an assembly. In a material-saving embodiment suitable for manufacturing, the slotted waveguide and the conductor profile can be formed in one piece from electrically conductive material.

The conductor strand can preferably be a grounding conductor strand for a grounding sliding contact and/or at least one additional conductor strand, specifically a phase conductor strand can be provided, in addition to the conductor strand.

The sliding contact and the antenna can preferably be arranged next to each other in the longitudinal direction. Two antennas can also be advantageously arranged one behind the other in the longitudinal direction.

The sliding contact and antenna can advantageously be arranged on a common feed mechanism for joint movement from and to the conductor profile and a longitudinal slot of the slotted waveguide.

In the conductor line system according to the invention, the traveling electric load can preferably have several sliding contacts for contacting with corresponding conductor profiles of the conductor line, in which at least one conductor profile forms a grounding conductor and/or protective conductor.

The conductor line system can also include a code rail, and a code-reading device can also be provided on the current collector instead of or in addition to the antenna.

BRIEF DESCRIPTION OF THE DRAWINGS

The invention is described below by means of detailed practical examples with reference to the accompanying drawings. In the drawings:

FIG. 2 shows a top front sectional view of the conductor line system from FIG. 1;

FIG. 3 shows a detailed view of part of the conductor line system from FIG. 2.

DETAILED DESCRIPTION OF THE INVENTION

Figure 1:
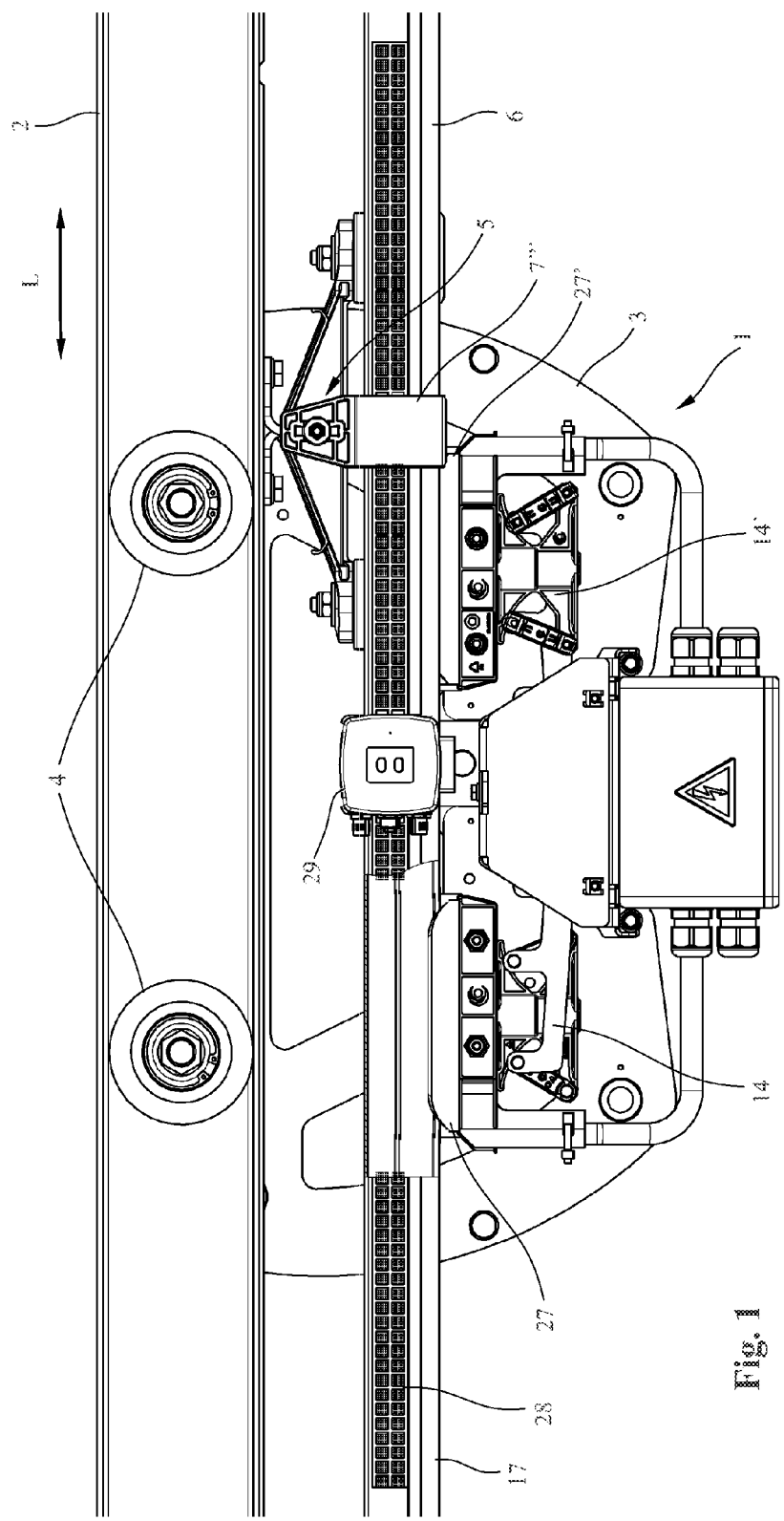
FIG. 1 shows a top side view of a section of a conductor line system according to the invention.

FIG. 1 shows a top view side of a section of a conductor line system 1 according to the invention having an essentially double U-shaped rail line 2. A current collector 3 of an electrical load (not shown) can be moved with track rollers 4 in a longitudinal direction L on rail line 2. The current collector 3 serves to supply the electrical load movable along the rail line 2, for example, a container crane.

On the lower side of the rail line 2 a conductor line 6 according to the invention is mounted hanging downward by means of conductor line holders 5 mounted so as to be spaced from each other in the longitudinal direction L of the rail line 2. The conductor line 6 then has three conductor strand holders 7, 7', and 7" to hold the elongated phase conductor strands 8, 8', and 8" arranged next to each other and readily apparent in FIG. 2. Because the phase conductor strands 8' and 8" are designed identically to the phase conductor strand 8, the comments made concerning the phase conductor strand 8 apply accordingly.

The phase conductor strand 8 has an elongated insulation profile 9, which is held by the conductor strand holder 7. An elongated electrically conductive phase conductor profile 10 with also an electrically conductive elongated sliding surface 11, preferably made of aluminum or steel, is then inserted into the insulation profile 9.

A sliding contact 12, which is arranged on a sliding contact support 13 of the current collector 3, slides on the sliding surface 11. The sliding contact support 13 with sliding contact 12 can be moved in known fashion via the feed mechanism 14 known per se and shown as an example in FIG. 1 both toward the sliding surface 11 and away from it. During operation the sliding contact 12 is continuously forced against the sliding surface 11, for example, via spring force. Additional sliding contacts 12' and 12" with corresponding sliding contact supports shown in FIG. 2 are largely identical to sliding contact 12 and sliding contact support 13 so that the comments made in this respect apply accordingly. In particular, each sliding contact 12, 12', and 12" has its own feed mechanism 14.

The phase conductor strand 8 serves for power supply of the traveling load and in normal operation is under voltage so that the current flows to the sliding contact 12 via the sliding surface 11. The arrangement described above is known in principle to one skilled in the art and requires no further comments.

In addition, in such a conductor line system 1 a grounding conductor strand 15 is ordinarily provided to connect the traveling electrical load to the ground potential of the conductor line system 1, which is described below mostly with reference to the detailed drawing in FIG. 3.

For this purpose the grounding conductor strand 15 has an electrically conductive grounding conductor profile 16 that is enclosed by a grounding insulation profile 17, like the phase conductor profile 10, and is fastened with a conductor strand holder 7''' to the conductor line 6, like the phase conductor strands 8, 8', 8", as is apparent in FIG. 1. For reasons of clarity, the grounding insulation profile 17 and the conductor strand holder 7''' are not shown in FIGS. 2 and 3.

The grounding conductor profile 16 in the present embodiment at the same time forms a known essentially T-shaped slotted waveguide 18, which is rotated or tilted around the longitudinal direction L by an angle α not equal to 90° relative to a travel plane E in which the current collector 3 travels. In particular, a longitudinal slot 19 of the slotted waveguide 18 is also tilted downward and outward by angle α and therefore extends obliquely at angle α rightward in FIG. 3.

A correspondingly offset antenna 20 is preferably used whose front antenna end 21, important for data transmission, is offset according to the tilting angle α of the slotted waveguide 18. Because of this, the antenna end 21 is then engaged in the desired fashion into the cavity of the slotted waveguide 18 through the tilted longitudinal slot 19 so that there are no disadvantages for data transmission. The antenna end 21, because of the offset antenna 20, then runs back in the line of symmetry of the T-shaped slotted waveguide 18.

An upper slot wall 22 of the longitudinal slot 19 in FIG. 3 forms a cover for the longitudinal slot 19, and an opposite lower slot wall 23 [forms a cover] against soiling by rain, dust, and other external influences.

In the embodiment depicted in FIG. 3, the upper slot wall 22 can be lengthened downward by a downward offset wall 24 in order to provide additional protection for the slotted waveguide 47 and antenna 20. The offset wall 24, however, is not absolutely necessary in order to achieve success according to the invention of the tilted slotted waveguide 18. Instead of the offset wall 24, the upper slot wall 23 can also be lengthened straight so that it protrudes below the lower slot wall 23. The offset upper slot wall 24 can also be completely omitted so that both slot walls 22, 23 are equally long.

A widened section 25 of the grounding insulation profile 17 slightly elastic relative to slotted waveguide 18 is provided on the lower slot wall 23. A sliding surface 26 for a grounding sliding contact 27 is again provided on section 25. The grounding sliding contact 27 can be moved via its own feed mechanism 14 to and from the sliding surface 26, like the sliding contacts 12, 12', and 12".

The tilted slotted waveguide 18 with the corresponding tilted antenna 20 has the advantage that the otherwise low tolerance for movement of antenna 20 in an X direction running across the longitudinal direction L is increased. The X direction then also runs parallel to travel plane E in which the current collector 3 is moved. Feed of the sliding contacts 12, 12', 12" and the grounding sliding contact 27 then ordinarily occurs in the height direction Z perpendicular to travel plane E. The travel plane E in the drawings therefore runs horizontally, i.e., is spanned by the longitudinal direction L in the X direction. In the conductor lines shown in DE 10 2004 008 571 B4 and DE 10 2011 119 351 A1 with conductor strands pointing to the side, the travel plane, on the other hand, runs vertically, because the sliding contacts therein are approached from the side on the conductor strands.

Because the longitudinal slot 19 with its narrow width S is tilted by angle α, the tolerance for movements of the antenna 20 in the travel plane E, especially in the X direction, is increased according to the invention. Touching of the walls 22, 23 of longitudinal slot 19 by the antenna 20 can be even better avoided on this account.

Because electrical power is not transmitted during normal operation via the grounding sliding contact 27, there is no hazard that arcing will occur between the grounding conductor profile 16 and the grounding sliding contact 27, which might adversely influence data transmission by means of slotted waveguide 18 and antenna 20. If larger currents should flow, however, this entails an emergency, in which case the conductor line system 1 should be quickly shut down anyway.

Grounding conductor profile 16 and slotted waveguide 18 are made in one piece in the present case from the same material and therefore form an assembly so that manufacture and installation can be simplified. Grounding conductor profile 16 and slotted waveguide 18, however, can also be made from separate parts and/or different materials. The slotted waveguide 18 can also have a different cross-section as appropriate.

By integration of the slotted waveguide 18 in the grounding conductor strand 15 and the grounding conductor profile 16, the conductor line 6 can be made very compact in the shown embodiment so that no space-consuming suspension separating them from each other need be provided for a grounding conductor strand and a slotted waveguide. The conductor line 6 can therefore be made smaller, meaning less material is required and installation is also simplified.

In order to further increase the reliability of the conductor line system 1, it can be prescribed, as in the embodiment depicted in FIG. 1, to arrange an additional antenna with grounding sliding contacts 27' on an additional feed mechanism 14'. An interruption, for example from a thermally separate connection site of the grounding conductor profile 16 and slotted waveguide 18 not formed from endless material, can be bridged without interrupting data transmission.

In addition, a known elongated code band 28 as shown in FIG. 1 can be arranged laterally on the grounding insulation profile 17, which can be read out via a known reading unit 29 mounted on the current collector 3 and therefore the position can be determined.

Instead of the combined assembly of grounding conductor profile 16 and slotted waveguide 18, these can also be formed from separate parts. For example, the grounding conductor strand 15 can be designed like the phase conductor strands 8, 8', 8", and the slotted waveguide 18 can be fastened on its own mount on the conductor line 6.

LIST OF REFERENCE NUMERALS

1 Conductor line system
2 Rail line
3 Current collector
4 Track rollers
5 Conductor line mounts
6 Conductor line
7, 7', 7" Conductor strand mounts
8, 8', 8" Phase conductor strands
9 Insulation profile
10 Phase conductor profile
11 Sliding surface phase conductor strand
12, 12', 12" Sliding contact
13 Sliding contact support
14 Feed mechanism
15 Grounding conductor strand
16 Grounding conductor profile
17 Grounding insulation profile
18 Tilted slotted waveguide
19 Tilted longitudinal slot
20 Antenna
21 Offset antenna end
22 Upper slot wall
23 Lower slot wall
24 Offset upper slot wall
25 Elastic section
26 Sliding surface grounding insulation profile
27 Grounding sliding contact
28 Code band
29 Reading unit
E Travel plane current collector
L Longitudinal direction conductor line
S Width of the longitudinal slot
X Direction across the longitudinal direction in the travel plane
Z Height direction perpendicular to the travel plane

The invention claimed is:

1. A conductor line to supply an electrical load movable on the conductor line in a longitudinal direction thereof, the conductor line comprising:
a conductor strand running in the longitudinal direction with an electrically conductive conductor profile contactable with a sliding contact of a current collector of the load and with an elongated slotted waveguide running in the longitudinal direction with a longitudinal slot to accommodate an antenna movable with the load,
wherein the longitudinal slot is tilted by an angle not equal to 90° around the longitudinal direction relative to a travel plane in which the current collector can be moved in the longitudinal direction.

2. The conductor line according to claim 1, wherein the angle is greater than or equal to 0° and less than 90°.

3. The conductor line according to claim 1, wherein the slotted waveguide is also tilted around an additional angle not equal to 90° around the longitudinal direction relative to travel plane, which is greater than or equal to 0° and less than 90°.

4. The conductor line according to claim 3, wherein the angle and the additional angle are equally large.

5. The conductor line according to claim 1, wherein the longitudinal slot and a contact opening for the conductor strand are tilted by angle relative to each other to accommodate the sliding contact.

6. The conductor line according to claim 1, wherein the conductor profile has at least one sliding surface for a correspondingly shaped and aligned sliding contact surface of the sliding contact across the longitudinal direction next to and/or beneath the longitudinal slot.

7. The conductor line according to claim 1, wherein the slotted waveguide and the conductor profile are made in one piece from electrically conductive material.

8. The conductor line according to claim 1, wherein the conductor strand is a grounding conductor strand for a grounding sliding contact and/or that at least one additional conductor strand, namely a phase conductor strand, is provided in addition to the conductor strand.

9. The conductor line according to claim 1, wherein the slotted waveguide and the conductor profile are designed as an assembly.

10. A current collector for an electrical load movable along a conductor line in a longitudinal direction, the current collector comprising:
a sliding contact contactable with an electrically conductive conductor profile of a conductor strand of the conductor line; and
an antenna for data transmission to an elongated slotted waveguide of the conductor line running in the longitudinal direction, in which the slotted waveguide has a longitudinal slot for the antenna,
wherein at least a portion of the antenna is tilted fully or partially by an angle not equal to 90° around the longitudinal direction relative to a travel plane in which the current collector can be moved in the longitudinal direction.

11. The current collector according to claim 10, wherein the angle is greater than or equal to 0° and less than 90°.

12. The current collector according to claim 11, wherein an end of the antenna extending into the longitudinal slot of the slotted waveguide is offset by angle.

13. The current collector according to claim 10, wherein the sliding contact and the antenna are arranged next to each other in the longitudinal direction.

14. The current collector according to claim 10, wherein two antennas are arranged one behind the other in the longitudinal direction.

15. The current collector according to claim 10, wherein the sliding contact and the antenna are arranged for joint movement from and to the conductor profile and their longitudinal slot on a common feed mechanism.

16. A conductor line system with an electrical load movable on a conductor line in a longitudinal direction thereof, the system comprising:
a current collector with a sliding contact contactable with an electrically conductive conductor profile of the conductor line; and
an antenna for data transmission with an elongated slotted waveguide of the conductor line running in the longitudinal direction, in which the hollow waveguide has a longitudinal slot for the antenna,
wherein the longitudinal slot is tilted by an angle not equal to 90° around the longitudinal direction relative to a travel plane in which the current collector can be moved in the longitudinal direction and wherein at least a portion of the antenna is tilted fully or partially by an angle not equal to 90° around the longitudinal direction relative to a travel plane in which the current collector can be moved in the longitudinal direction.

17. The conductor line system according to claim 16, wherein the movable electric load has several sliding contacts contactable with corresponding conductor profiles of the conductor line, in which at least one conductor profile forms at least one of a grounding conductor and a protective conductor.

\* \* \* \* \*